United States Patent
Ueda

(10) Patent No.: US 10,104,255 B2
(45) Date of Patent: Oct. 16, 2018

(54) INFORMATION PROCESSING APPARATUS, DATA SHARING METHOD, AND DATA-SHARING PROGRAM

(71) Applicant: Konica Minolta, Inc., Tokyo (JP)

(72) Inventor: Shigeyuki Ueda, Kodaira (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/843,339

(22) Filed: Dec. 15, 2017

(65) Prior Publication Data

US 2018/0176403 A1 Jun. 21, 2018

(30) Foreign Application Priority Data

Dec. 19, 2016 (JP) ................................ 2016-245773

(51) Int. Cl.
| | |
|---|---|
| G06K 15/00 | (2006.01) |
| H04N 1/00 | (2006.01) |
| G06F 3/12 | (2006.01) |
| H04N 1/32 | (2006.01) |

(52) U.S. Cl.
CPC ....... H04N 1/00891 (2013.01); G06F 3/1221 (2013.01); H04N 1/32379 (2013.01); H04N 2201/0094 (2013.01)

(58) Field of Classification Search
None
See application file for complete search history.

(56) References Cited

U.S. PATENT DOCUMENTS

| | | | | |
|---|---|---|---|---|
| 8,190,735 | B2* | 5/2012 | Ohara | G06F 3/1221 709/223 |
| 8,793,677 | B2* | 7/2014 | Harada | G06F 1/3203 717/168 |
| 9,584,693 | B2* | 2/2017 | Iizuka | G06K 15/4055 |
| 2006/0274368 | A1* | 12/2006 | Imine | G06K 15/00 358/1.15 |
| 2010/0169678 | A1* | 7/2010 | Kozuka | G06F 1/3221 713/310 |
| 2012/0155945 | A1* | 6/2012 | Ogushi | B41J 29/38 400/76 |

(Continued)

FOREIGN PATENT DOCUMENTS

JP 2012-131081 A 7/2012

*Primary Examiner* — Dung D Tran
(74) *Attorney, Agent, or Firm* — Osha Liang LLP

(57) ABSTRACT

An information processing apparatus, which can communicate with other information processing apparatuses, includes: a volatile storage; a nonvolatile storage; a storage controller that associates data with a user and stores the data; a data manager that shares management information with the other information processing apparatuses; an operation user detector that detects a user operating any of the apparatuses as an operation user; an operation state switcher that switches between a first operation and a second operation state; a data specifier that specifies data related to the operation user and an apparatus stored with the data; a data obtainer that obtains data from a storage device; a transferer that stores data stored in the nonvolatile storage among the specified data in the volatile storage; and a data supplier that returns data specified by a request among the data stored in the second or the volatile storage.

15 Claims, 8 Drawing Sheets

(56) References Cited

U.S. PATENT DOCUMENTS

| | | | |
|---|---|---|---|
| 2016/0117135 A1* | 4/2016 | Yoshida | G06F 3/1222 358/1.15 |
| 2016/0378406 A1* | 12/2016 | Kaku | G06F 3/1205 358/1.15 |

* cited by examiner

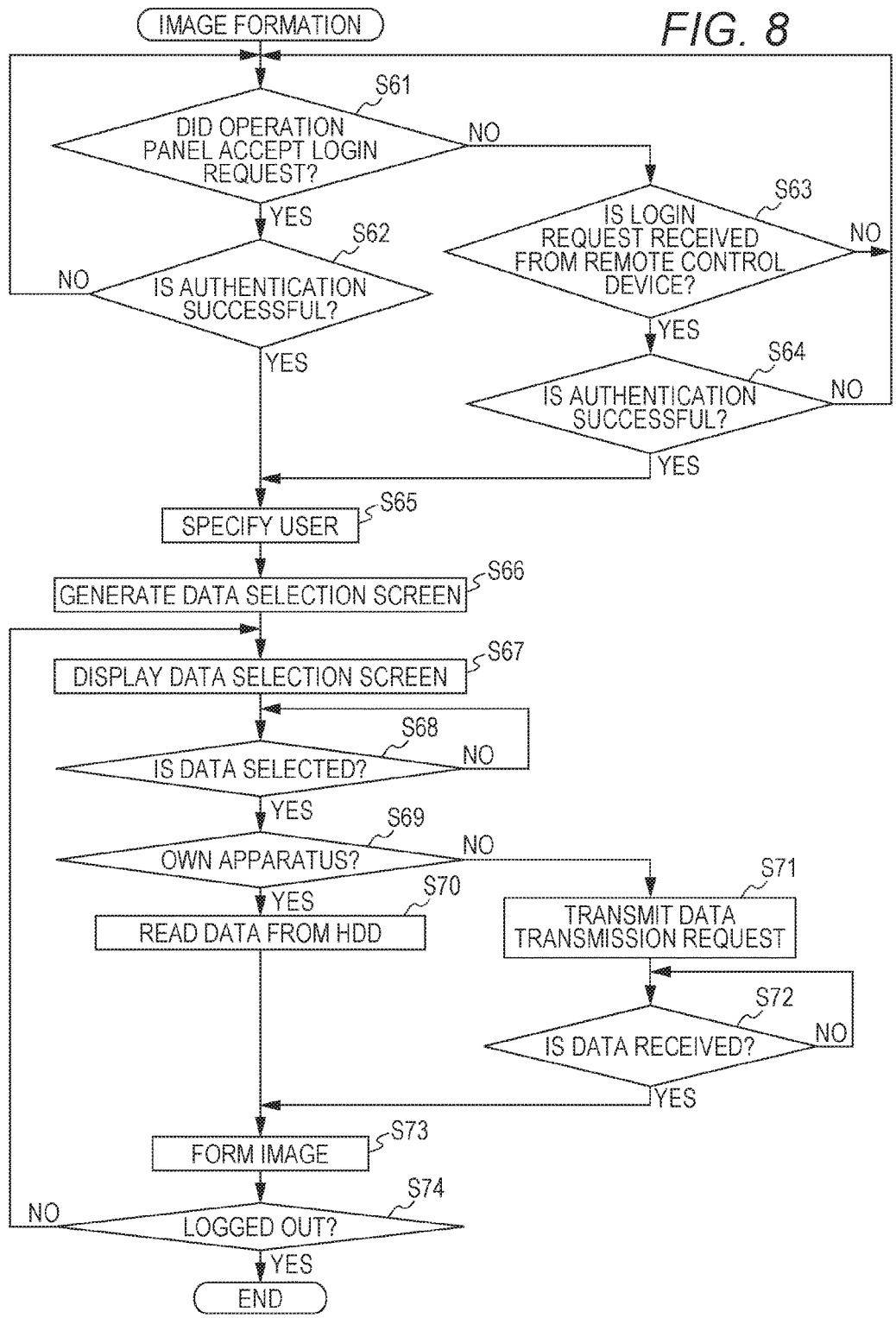

INFORMATION PROCESSING APPARATUS, DATA SHARING METHOD, AND DATA-SHARING PROGRAM

CROSS-REFERENCE TO RELATED APPLICATIONS

The entire disclosure of Japanese patent Application No. 2016-245773, filed on Dec. 19, 2016, is incorporated herein by reference in its entirety.

BACKGROUND

Technical Field

The present invention relates to an information processing apparatus, a data sharing method, and a data-sharing program, particularly to an information processing apparatus that shares data with another information processing apparatus connected to a network, a data sharing method and a data-sharing program that are executed by the information processing apparatus.

Description of the Related Art

In recent years, there is a case where a plurality of multifunction peripherals (hereinafter referred to as "MFPs") are connected to a network, and there is known a ubiquitous printing function, which is a function in which a user operates any MFP to form an image of data stored in any of the plurality of MFPs.

Meanwhile, in order to reduce power consumption, the MFP sometimes shifts to a power supply mode with lower power consumption than that in the power supply mode in a state used by a user. In the power supply mode with low power consumption, electric power supply to a storage device, such as hard disk drive (HDD), is cut off to stop the storage device. For this reason, when the MFP operated by a user obtains a print job stored in the HDD of another MFP, it is necessary to activate the HDD to read out the print job when the another MFP is in the power supply mode with low power consumption, causing a case that maintaining the power supply mode with low power consumption is not possible.

JP 2012-131081 A describes a technique for storing data stored in an HDD into a RAM before shifting to a power supply mode with low power consumption. JP 2012-131081 A discloses a printing apparatus that performs printing based on print data from one or a plurality of host devices, has a hard disk drive storing print information related to each print data, and has at least a first operation state in which the hard disk drive is powered ON and a second operation state in which the hard disk drive is powered OFF. The printing apparatus has a memory for temporarily storing various information; a storing and processing unit for copying a portion of print information stored in the hard disk drive into the memory upon transition from the first operation state to the second operation state; a comparison unit for comparing the requested print information with the print information stored in the memory when the acquisition of the print information is requested from a host device after being shifted to the second operation state; and a response unit for transmitting the response to the host device of a request source, by using the print information stored in the memory, when the requested print information is stored in the memory as a result of the comparison.

However, in the printing apparatus described in JP 2012-131081 A, since the portion of the print information related to the print data is stored in the RAM, the HDD is required to be activated in order to transmit print data, in an environment to realize the ubiquitous printing function.

SUMMARY

One or more embodiments of the present invention provide an information processing apparatus capable of reducing power consumption in a state of not being operated by a user in an environment allowing communication with one or more other information processing apparatuses.

One or more embodiments of the present invention provide a data sharing method capable of reducing power consumption in a state of not being operated by a user in an environment allowing communication with one or more other information processing apparatuses.

One or more embodiments of the present invention provide a data-sharing program capable of reducing power consumption in a state of not being operated by a user in an environment allowing communication with one or more other information processing apparatuses.

According to one or more embodiments of the present invention, there is provided an information processing apparatus capable of communicating with one or more other information processing apparatuses, and the information processing apparatus reflecting one or more embodiments of the present invention comprises: a first storage that is volatile; a second storage that is nonvolatile; a storage controller that associates data related to each of a plurality of users with a user associated with the data, and stores the data into the second storage; a data manager that shares, with the one or more other information processing apparatuses, management information that associates the data stored in the second storage, a user associated with the data, and an own apparatus, and management information that associates data stored in each of the one or more other information processing apparatuses, a user associated with the data, and an apparatus stored with the data; an operation user detector that detects, as an operation user, a user operating any of the own apparatus and the one or more other information processing apparatuses; an operation state switcher that switches between a first operation state in which electric power is supplied to the second storage, and a second operation state in which electric power is not supplied to the second storage; a data specifier that refers to the management information to specify data related to the operation user and an apparatus stored with the data when the operation user is detected; a data obtainer that obtains data from a storage device by requesting transmission to the storage device, when the data designated by the operation user among the specified data is stored in any of the one or more other information processing apparatuses in a case where the operation user operates the own apparatus; a transferer that stores data in the first storage, the data being stored in the second storage among the specified data, before the operation state is switched to the second operation state, when the operation user operates any of the one or more other information processing apparatuses; and a data supplier that returns, in response to a request from any of the one or more other information processing apparatuses, data specified by the request among the data stored in the second storage in the first operation state, and data specified by the request among data stored in the first storage in the second operation state.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a flowchart showing an example of a flow of an image formation process.

DETAILED DESCRIPTION OF EMBODIMENTS

Figure 1:
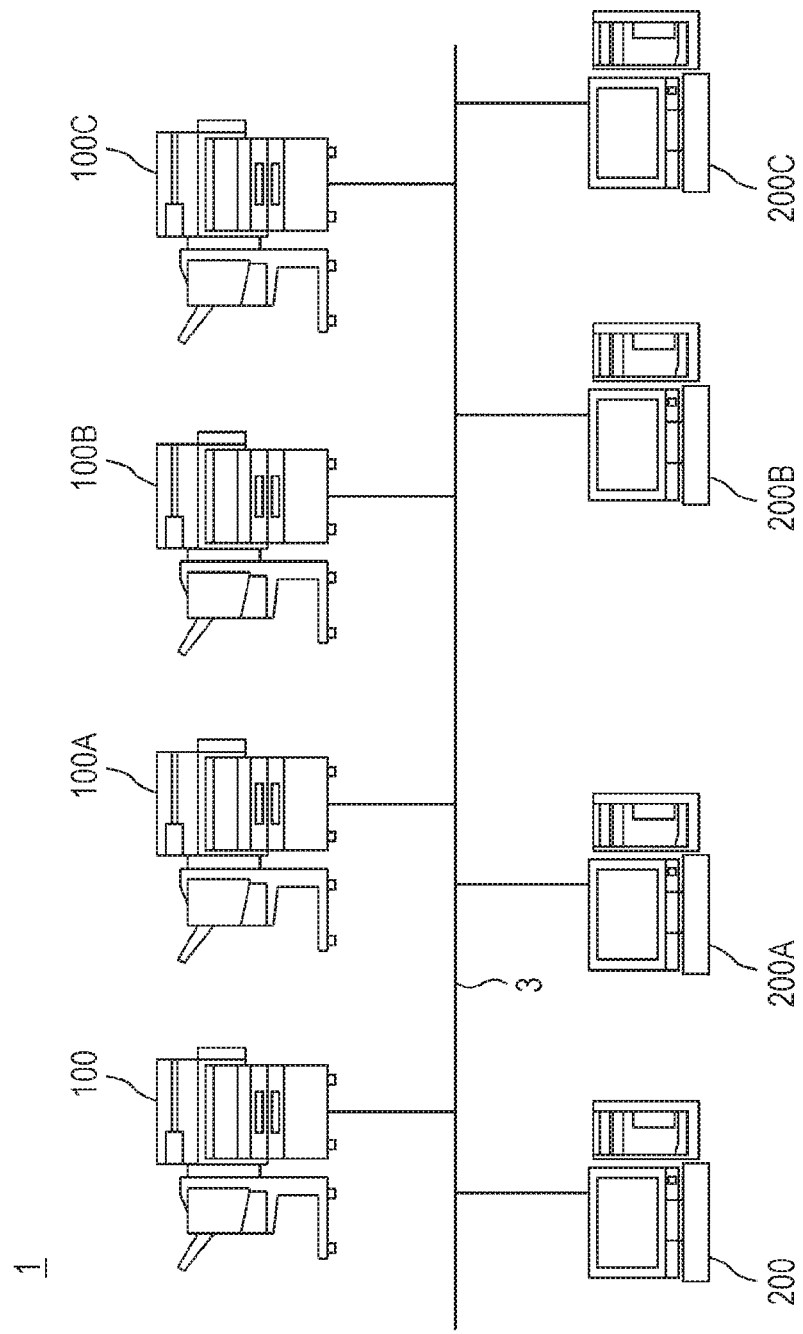
FIG. 1 is a diagram showing an overall outline of a print system according to one or more embodiments of the present invention.

Hereinafter, one or more embodiments of the present invention will be described with reference to the drawings. However, the scope of the invention is not limited to the disclosed embodiments. In the following description, the same reference numerals are given to the same parts. Their names and functions are also the same. Therefore, detailed description thereof will not be repeated.

FIG. 1 is a diagram showing an overall outline of a print system according to one or more embodiments of the present invention. Referring to FIG. 1, a print system 1 includes multi-function peripherals (MFPs) 100 and 100A to 100C, and PCs 200 and 200A to 200C. The MFPs 100 and 100A to 100C, and the PCs 200 and 200A to 200C are examples of information processing apparatuses, and are connected to a network 3.

The network 3 is a local area network (LAN), and its connection form may be wired or wireless. Further, the network 3 is not limited to the LAN, but may be a wide area network (WAN), a public switched telephone network (PSTN), the Internet, or the like.

The PCs 200, 200A, 200B, and 200C are general computers. A printer driver program corresponding to the MFPs 100, 100A, and 100B is installed in each of the PCs 200, 200A, 200B, and 200C. Executing the printer driver program enables control of any of the MFPs 100 and 100A to 100C to execute a print job. Since the PCs 200 and 200A to 200C are general computers, and their hardware configurations are well known, detailed description thereof will not be repeated here.

Since the hardware configurations and functions of the MFPs 100 and 100A to 100C are the same, the MFP 100 will be described as an example here, unless otherwise mentioned. In one or more embodiments of the present invention, the MFPs 100 and 100A to 100C can share data by communicating with each other, and realize the ubiquitous printing function. This allows a user to operate without being aware of distinction among the MFPs 100 and 100A to 100C. In order to realize the ubiquitous printing function, the MFPs 100 and 100A to 100C register other apparatuses with each other. For example, the MFP 100 registers the other MFPs 100A to 100C. Specifically, the MFP 100 stores apparatus identification information for identifying each of the other MFPs 100A to 100C. The apparatus identification information is, for example, an address network address such as an internet protocol (IP).

Specifically, one or more users permitted to use the MFPs 100 and 100A to 100C are registered in each of the MFPs 100 and 100A to 100C. Here, an example will be described in which a plurality of users permitted to use the MFPs 100 and 100A to 100C are registered. When a user operates any of the MFPs 100 and 100A to 100C, the apparatus operated by the user authenticates the user. Although the authentication method is not limited, an authentication method using a pair of a user ID and password is used here. Therefore, the MFPs 100 and 100A to 100C share authentication information of each of the plurality of the registered users, and authenticate a user by comparing the authentication information entered by the user with the registered authentication information.

For example, a job transmitted from the PC 200 to the MFP 100A through operation of the PC 200 by a user is temporarily stored in the MFP 100A. Thereafter, when the user operates the MFP 100, the MFP 100 queries the MFPs 100A to 100C for the presence or absence of the job of the user who has logged in to the MFP 100, obtains the job identification information of the job transmitted from the PC 200 to the MFP 100A by the user, from the MFP 100A, and notifies the user of the job identification information of the job. When the user selects the job identification information and instructs printing, the MFP 100 obtains the job from the MFP 100A and performs printing.

Figure 2:
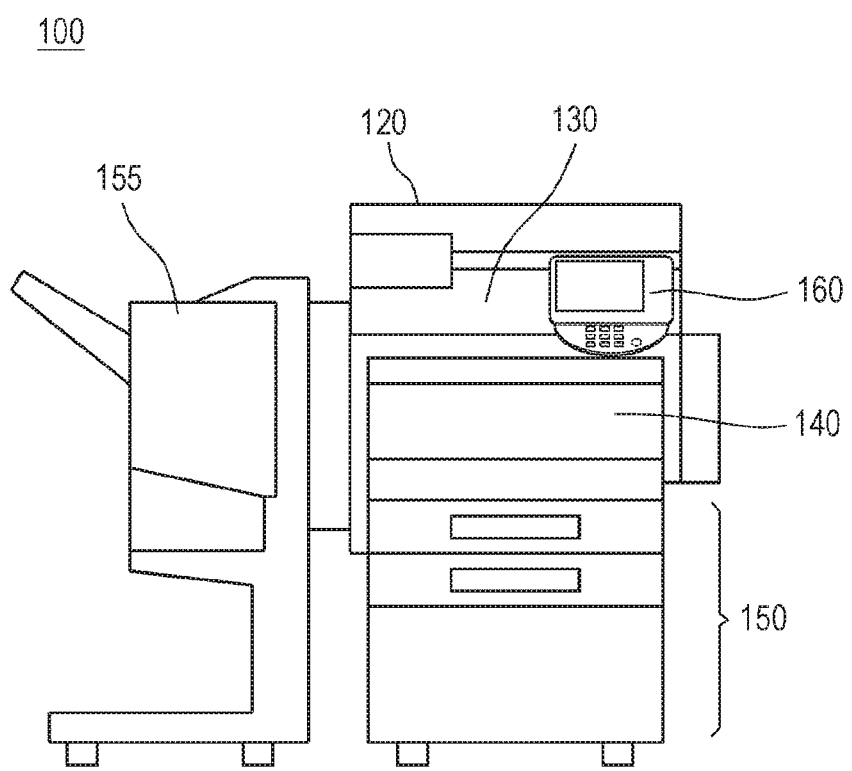
FIG. 2 is a perspective view showing an appearance of an MFP.
Figure 3:
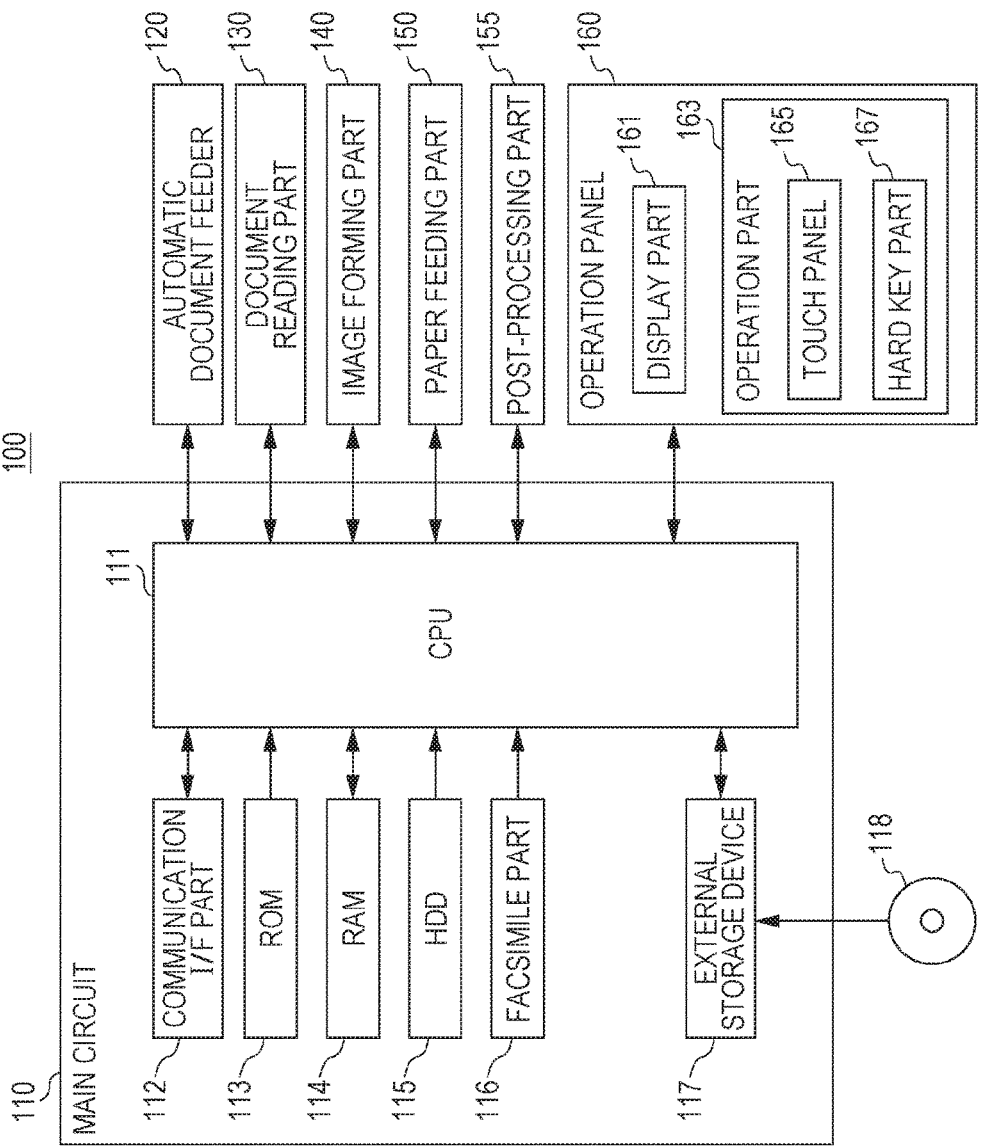
FIG. 3 is a block diagram showing an outline of a hardware configuration of the MFP.

FIG. 2 is a perspective view showing an appearance of the MFP. FIG. 3 is a block diagram showing an outline of a hardware configuration of the MFP. Referring to FIGS. 2 and 3, the MFP 100 includes: a main circuit 110; a document reading part 130 to read a document; an automatic document feeder 120 to convey the document to the document reading part 130; an image forming part 140 to form an image on a paper or the like based on image data read and outputted by the document reading part 130; a paper feeding part 150 to feed paper to the image forming part 140; a post-processing part 155 to process a paper formed with the image; and an operation panel 160 as a user interface.

The post-processing part 155 executes a sorting process of rearranging and discharging one or more papers on which an image is formed by the image forming part 140, a punching process of punching holes, and a stapling process of driving a staple.

The main circuit 110 includes a CPU 111, a communication interface (I/F) part 112, a ROM 113, a RAM 114, a hard disk drive (HDD) 115 as a mass storage device, a facsimile part 116, and an external storage device 117 mounted with a CD-ROM 118. The CPU 111 is connected to the automatic document feeder 120, the document reading part 130, the image forming part 140, the paper feeding part 150, the post-processing part 155, and the operation panel 160, and controls the entire MFP 100.

The ROM 113 stores a program executed by the CPU 111 or data necessary for executing the program. The RAM 114 is used as a work area when the CPU 111 executes a program. Further, the RAM 114 temporarily stores a read data (image data) continuously sent from the document reading part 130.

The communication I/F part 112 is an interface to connect the MFP 100 to the network 3. The CPU 111 communicates with the PC 200 or the PCs 200, 200A, and 200B via the communication I/F part 112 to transmit and receive data. Further, the communication I/F part 112 can communicate with a computer connected to the Internet via the network 3.

The facsimile part 116 is connected to the public switched telephone network (PSTN) to transmit facsimile data to the PSTN or receive facsimile data from the PSTN. The facsimile part 116 stores the received facsimile data into the HDD 115 or outputs the facsimile data to the image forming part 140. The image forming part 140 prints the facsimile data received by the facsimile part 116 on a paper. Further, the facsimile part 116 converts the data stored in the HDD 115 into facsimile data to transmit the facsimile data to a facsimile machine connected to the PSTN.

The external storage device 117 is mounted with the compact disk ROM (CD-ROM) 118. The CPU 111 can access the CD-ROM 118 via the external storage device 117. The CPU 111 loads the program recorded in the CD-ROM 118 mounted to the external storage device 117 into the RAM 114, to execute the program. A medium that stores a program to be executed by the CPU 111 is not limited to the CD-ROM 118, but may be an optical disk (magnetic optical disc (MO)/mini disc (MD)/digital versatile disc (DVD)), or a semiconductor memory such as an IC card, an optical card, a mask ROM, an erasable programmable ROM (EPROM), or an electrically EPROM (EEPROM).

In addition, the program executed by the CPU 111 is not limited to the program recorded in the CD-ROM 118, and the program stored in the HDD 115 may be loaded into the RAM 114 to be executed. In this case, another computer connected to the network 3 may rewrite the program stored in the HDD 115 of the MFP 100, or add and write a new program. Further, the MFP 100 may download a program from another computer connected to the network 3, and store the program into the HDD 115. The program herein includes a source program, a compressed program, an encrypted program, and the like, in addition to a program directly executable by the CPU 111.

The operation panel 160 is provided on an upper surface of the MFP 100, and includes a display part 161 and an operation part 163. The display part 161 is, for example, a liquid crystal display (LCD) or organic electroluminescence (EL) display, and displays an instruction menu for a user, information on obtained image data, and the like. The operation part 163 includes a touch panel 165 and a hard key part 167. The touch panel 165 is provided to be superimposed on the display part 161 on an upper surface or a lower surface of the display part 161. The hard key part 167 includes a plurality of hard keys. The hard key is, for example, a contact switch. The touch panel 165 detects a position instructed by a user on a display surface of the display part 161. Since a user is often in an upright posture when operating the MFP 100, the display surface of the display part 161, an operation surface of the touch panel 165, and the hard key part 167 are arranged facing upward. This is to allow the user to easily view the display surface of the display part 161 and easily instruct the operation part 163 with the user's fingers.

Figure 4:
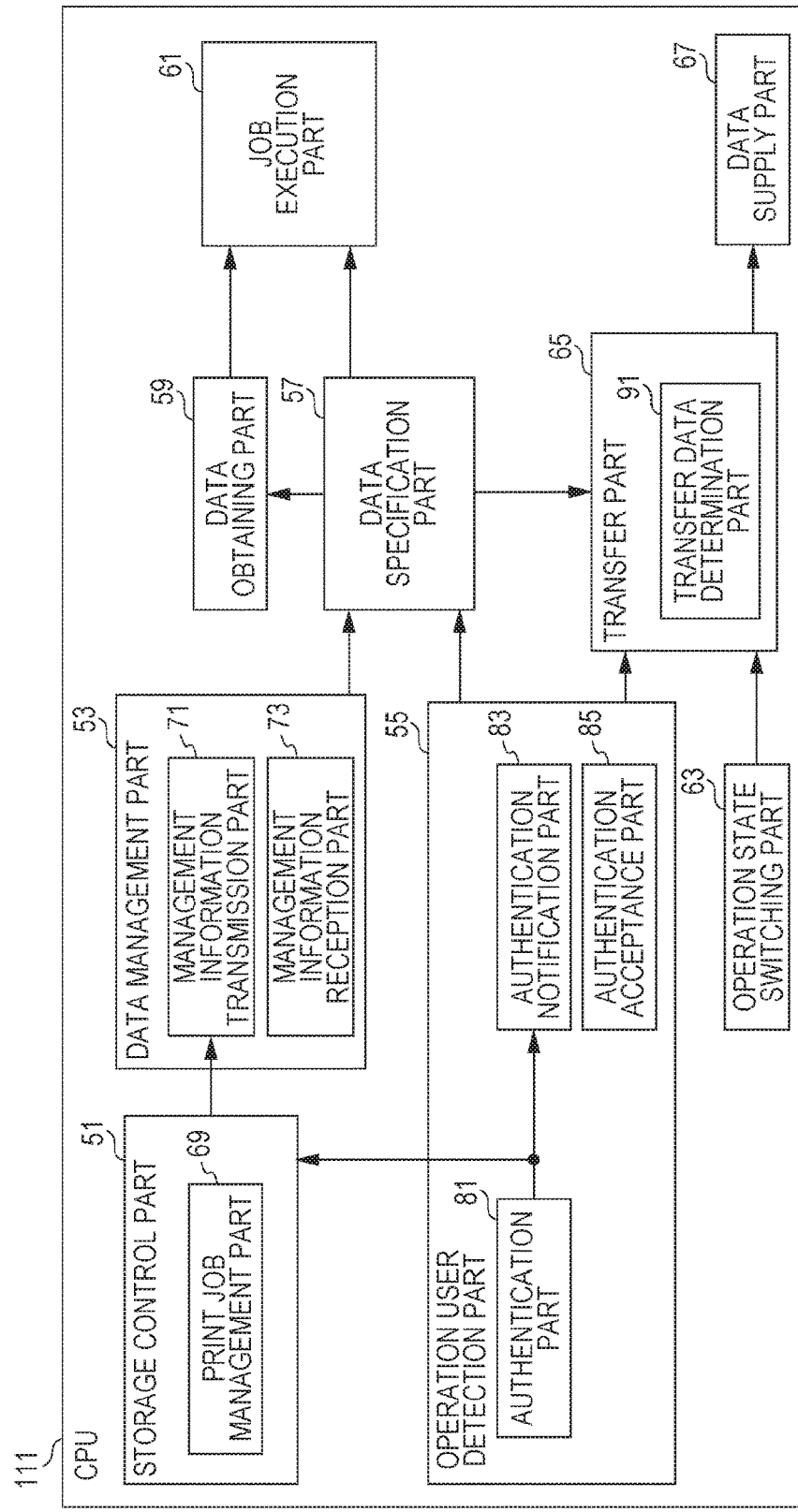
FIG. 4 is a block diagram showing an example of a function of a CPU provided in the MFP.

FIG. 4 is a block diagram showing an example of a function of the CPU provided in the MFP. The function shown in FIG. 4 is a function that is formed by the CPU 111 by executing a data-sharing program stored in the ROM 113, the HDD 115, and the CD-ROM 118, with the CPU 111 provided to the MFP 100. Referring to FIG. 4, the CPU 111 includes a storage control part 51, a data management part 53, an operation user detection part 55, a data specification part 57, a data obtaining part 59, a job execution part 61, an operation state switching part 63, a transfer part 65, and a data supply part 67.

The operation user detection part 55 detects a user operating the MFPs 100 and 100A to 100C. The operation user detection part 55 includes an authentication part 81, an authentication notification part 83, and an authentication acceptance part 85. The authentication part 81 authenticates a user operating the operation part 163 or a user who remotely operates the MFP 100. For example, the authentication part 81 displays a login screen on the display part 161, and accepts a user ID and password entered to the operation part 163 by a user according to the login screen. The authentication part 81 compares the user ID and password accepted by the operation part 163 with previously stored authentication information. Then, when the user ID and password accepted by the operation part 163 are stored as authentication information, the user operating the operation part 163 is authenticated. When authenticating the user operating the operation part 163, the authentication part 81 outputs user identification information for identifying the user to the authentication notification part 83 and the storage control part 51. The user can remotely operate the MFP 100 by operating any of the PCs 200 and 200A to 200D. For example, when the user operates the PC 200 to remotely operate the MFP 100, the authentication part 81 transmits the login screen to the PC 200 via the communication I/F part 112. When a user operating the PC 200 enters the user ID and password to the PC 200 according to the login screen displayed on the PC 200, the PC 200 transmits them to the MFP 100. The authentication part 81 accepts the user ID and password received by the communication I/F part 112 from the PC 200. The authentication part 81 compares the user ID and password received from the PC 200 with the previously stored authentication information. Then, when the user ID and password received from the PC 200 are stored as authentication information, the user operating the PC 200 is authenticated. When authenticating the user operating the PC 200, the authentication part 81 outputs the user identification information for identifying the user to the authentication notification part 83 and the storage control part 51.

In response to the input of the user identification information from the authentication part 81, the authentication notification part 83 transmits the login information including the user identification information to each of the MFPs 100A to 100C. This enables specifying of a user operating the MFP 100A, in each of the MFPs 100A to 100C.

Further, when the authenticated user logs out, the authentication notification part 83 transmits logout information indicating that the user has logged out, to each of the MFPs 100A to 100C. The logout information includes the user identification information of the authenticated user. After the user identification information is input from the authentication part 81, when a period during which the operation part 163 accepts no operation continues for a predetermined time, logout is detected. When the operation part 163 accepts an operation to instruct logout, logout is detected. Furthermore, when remotely operated by any of the PCs 200 and 200A to 200C, for example, by the PC 200, the logout is detected when a communication path established by the communication I/F part 112 with the PC 200 is disconnected, in addition to the logout by an operation performed by the user operating the PC 200.

The authentication acceptance part 85 controls the communication I/F part 112 to receive login information and logout information from any of the other MFPs 100A to 100D. Since the login information includes the user identification information, it is possible to specify the user operating the apparatus that has transmitted the login information, at a time when the authentication acceptance part 85 receives the login information. Since the logout information includes the user identification information, it is possible to specify the user who has logged out from the apparatus that has transmitted the logout information.

When the user operating the operation part 163 is authenticated by the authentication part 81, the operation user detection part 55 outputs, to the data specification part 57, authentication user information including the apparatus identification information of the own apparatus and the user identification information of the user authenticated by the authentication part 81. When the authentication acceptance part 85 receives the login information from any of the other MFPs 100A to 100C, the operation user detection part 55 outputs, to the data specification part 57 and the transfer part 65, the authentication user information including the apparatus identification information of the apparatus that has transmitted the login information and the user identification information included in the login information. When the authentication acceptance part 85 receives the logout information from any of the other MFPs 100A to 100C, the operation user detection part 55 outputs, to the transfer part 65, user logout information including the apparatus identification information of the apparatus that has transmitted the logout information and the user identification information included in the logout information.

The storage control part 51 controls the HDD 115 to store data related to each of a plurality of users into the HDD 115 in association with the user associated with the data. The HDD 115 includes an individual area allocated to at least one of the plurality of users, and a shared area that can be shared by the plurality of users. The individual area is an area exclusively accessible by the user assigned to that area, and the shared area is an area accessible by the plurality of users. For example, when a user operates any of the PCs 200 and 200A to 200C, for example, the PC 200 to remotely operate the MFP 100, it is possible to store the data transmitted from the PC 200 into the individual area assigned to the user or into the shared area.

Further, from the authentication part 81, the user identification information of the user operating the operation part 163 is input to the storage control part 51. After the user identification information is input from the authentication part 81, the storage control part 51 determines that the operation input to the operation part 163 is an operation performed by the user specified by the user identification information. For example, when the operation part 163 is input with an operation that causes the document reading part 130 to read the document, and causes the HDD 115 to store the image data output by the document reading part 130, the storage control part 51 stores the image data output by the document reading part 130 into the HDD 115. In this case, the storage control part 51 stores the image data into the shared area, or into the individual area assigned to the user specified by the user identification information input from the authentication part 81. The storage control part 51 outputs, for each of the data stored in the HDD 115, data management information corresponding to the data to the data management part 53. The data management information corresponding to the data includes a set of data identification information for identifying the data, and the user identification information input from the authentication part 81.

The storage control part 51 includes a print job management part 69. When the communication I/F part 112 receives a print job from any of the PCs 200 and 200A to 200C, for example, from the PC 200, the print job management part 69 stores the print job into a predetermined area of the HDD 115. The print job includes the user identification information of the user who has instructed transmission of the print job. In response to the print job management part 69 storing the print job into the HDD 115, the storage control part 51 outputs the data management information corresponding to the print job, to the data management part 53. The data management information corresponding to the print job includes a set of print job identification information for identifying the print job, and the user identification information included in the print job.

The data management part 53 manages the data stored in the HDD 115 of each of the MFPs 100 and 100A to 100C registered to realize the ubiquitous printing function. The data management part 53 shares, with the MFPs 100 and 100A to 100C, management information that associates data identification information for identifying data stored in the HDD 115 of each of the MFPs 100 and 100A to 100C, a user associated with the data, and the apparatus stored with that data. The data management part 53 includes a management information transmission part 71 and a management information reception part 73. The management information transmission part 71 controls the communication I/F part 112 to transmit the data management information input from the storage control part 51, to each of the other MFPs 100A to 100C. The management information reception part 73 controls the communication I/F part 112 to receive the management information, from each of the other MFPs 100A to 100C. The data management part 53 generates management information based on the management information input from the storage control part 51, and the management information reception part 73 generates management information based on the data management information received from any of the other MFPs 100A to 100C. Specifically, the data management part 53 generates management information including the data identification information included in the data management information input from the storage control part 51, the user identification information, and the apparatus identification information of the own apparatus. Further, the data management part 53 generates management information corresponding to the data stored in the shared area of the HDD 115. Specifically, for each of the data stored in the shared area of the HDD 115, the data management part 53 generates the management information including the data identification information of the data, sharing identification information indicating that the data is shared data, and the apparatus identification information of the own apparatus. The data management part 53 generates management information including the data management information received by the management information reception part 73 and the apparatus identification information of the apparatus that has transmitted the data management information. The data management information includes data identification information and the user identification information or sharing identification information. The data management part 53 outputs the generated management information to the data specification part 57.

The data specification part 57 specifies the management information in response to the input of the authentication user information from the operation user detection part 55. Specifically, the data specification part 57 extracts management information including the same user identification information as the user identification information included in the authentication user information, or management information including sharing identification information, from the management information input from the data management part 53. When the apparatus identification information included in the authentication user information is the apparatus identification information of the own apparatus, the data specification part 57 outputs the extracted management information to the data obtaining part 59. When the apparatus identification information included in the authentication user information is apparatus identification information of any of the MFPs 100A to 100C different from the own apparatus, the data specification part 57 outputs the extracted management information to the transfer part 65.

When the management information is input from the data specification part 57, the data obtaining part 59 displays a data selection screen on the display part 161, and the user selects data according to the input operation on the operation part 163. The data selection screen is a screen to selectably display the data identification information included in the management information. When a plurality of pieces of management information are input from the data specification part 57, the data selection screen is a screen on which a plurality of pieces of data identification information respectively included in the plurality of pieces of management information are arranged and selectably displayed. In response to selecting of the data identification information according to an input operation by the user to the operation part 163, the data obtaining part 59 obtains the data specified by the data identification information. Specifically, since the management information includes the data identification information and the apparatus identification information of the apparatus that stores the data specified by the data identification information, the data obtaining part 59 refers to the management information to determine the apparatus identification information of the apparatus that stores the data specified by the data identification information.

When the apparatus identification information included in the management information input from the data specification part 57 is the apparatus identification information of the own apparatus, the data obtaining part 59 obtains data specified by the data identification information from the HDD 115, and outputs the obtained data to the job execution part 61. When the apparatus identification information included in the management information input from the data specification part 57 is different from the apparatus identification information of the own apparatus, the data obtaining part 59 controls the communication I/F part 112 to transmit a transmission request command for requesting the apparatus specified by the apparatus identification information to transmit the data specified by the data identification information, and obtains data returned by the apparatus that has sent the transmission request command. For example, when data specified by the data identification information is stored in the MFP 100A, the data obtaining part 59 transmits a transmission request command to the MFP 100A. In response to receiving the transmission request command, the MFP 100A returns the data specified by the transmission request command, so that the data obtaining part 59 obtains data received from the MFP 100A by the communication I/F part 112. The data obtaining part 59 outputs the obtained data to the job execution part 61.

The job execution part 61 executes a job based on the data input from the data obtaining part 59. When the data input from the data obtaining part 59 is a print job, the job execution part 61 controls the image forming part 140 and the paper feeding part 150 to form an image of print data included in the print job on a paper according to a printing condition included in the print job. When the data input from the data obtaining part 59 is different from a print job, the job execution part 61 accepts a printing condition entered by the user to the operation part 163, and controls the image forming part 140 and the paper feeding part 150 to form an image of the data on a paper according to the accepted printing condition.

The operation state switching part 63 switches the power sharing mode for supplying power to the hardware resources provided to the own apparatus, to either of a normal mode (first operation state) and a power saving mode (second operation state) that consumes less electric power than the normal mode. The hardware resources include the main circuit 110, the automatic document feeder 120, the document reading part 130, the image forming part 140, the paper feeding part 150, the post-processing part 155, and the operation panel 160. In the normal mode, electric power is supplied to all of the hardware resources. In the power saving mode, electric power is not supplied to the automatic document feeder 120, the document reading part 130, the image forming part 140, the paper feeding part 150, the post-processing part 155, the operation panel 160, and a part of the main circuit 110. For the main circuit 110, electric power is supplied to at least the CPU 111, the communication I/F part 112, and the RAM 114 in the power saving mode, while power is not supplied to the HDD 115. For the communication I/F part 112, the facsimile part 116, and the external storage device, electric power may be supplied in the power saving mode, or electric power may not be supplied. The operation state switching part 63 outputs the power supply mode to the transfer part 65.

The operation state switching part 63 switches to the power saving mode when a predetermined time elapses without the operation part 163 accepting an operation in the normal mode state. When a user remotely operates the MFP 100 with any of the PCs 200 and 200A to 200C, for example, with the PC 200, the operation state switching part 63 switches to the normal mode without switching to the power saving mode while a user operating the PC 200 is logged in, and switches to the power saving mode when the user logs out. When switching the power supply mode from the normal mode to the power saving mode, the operation state switching part 63 outputs a transfer instruction to the transfer part 65 before switching to the power saving mode.

In response to the input of the transfer instruction from the operation state switching part 63, the transfer part 65 transfers, from the HDD 115 to the RAM 114, the data specified by the data identification information included in the management information input from the data specification part 57, and stores the data into the RAM 114. Specifically, the transfer part 65 excludes, from processing targets, management information including the apparatus identification information and the user identification information included in the user logout information input from the operation user detection part 55, among the management information input from the data specification part 57. This is to exclude data associated with a user who is not logged in to any of the other MFPs 100A to 100C. The transfer part 65 reads out data specified by the data identification information included in the remaining management information as the processing target from the HDD 115, and stores the data into the RAM 114.

The transfer part 65 includes a transfer data determination part 91. When there are a plurality of pieces of management information as processing targets, the transfer data determination part 91 determines one or more pieces of data as transfer data to be transferred to the RAM 114, among the data respectively specified by the plurality of pieces of management information. The transfer part 65 reads out the transfer data determined by the transfer data determination part 91 from the HDD 115, and stores the data into the RAM 114.

In response to receiving the transmission request command from any of the other MFPs 100A to 100C, the data supply part 67 controls the communication I/F part 112 to determine either of the HDD 115 and the RAM 114 as a storage device to be read out. When the power supply mode is the normal mode, the data supply part 67 determines the HDD 115 to be read out, reads out the data specified by the data identification information included in the transmission request command from the HDD 115, and controls the communication I/F part 112 to transmit the data to the apparatus that has transmitted the transmission request command, among the other MFPs 100A to 100C. When the power supply mode is the power saving mode, the data supply part 67 determines the RAM 114 to be read out, and reads out data from the RAM 114 when the data specified by the data identification information included in the transmission request command is stored in the RAM 114, and controls the communication I/F part 112 to transmit the data to the apparatus that has transmitted the transmission request command, among the other MFPs 100A to 100C. If the data specified by the data identification information included in the transmission request command is not stored in the RAM 114, the data supply part 67 requests the operation state switching part 63 to switch to the normal mode, reads out, from the HDD 115, the data specified by the data identification information included in the transmission request command after the HDD 115 is activated, and controls the communication I/F part 112 to transmit the data to the apparatus that has transmitted the transmission request command, among the other MFPs 100A to 100C.

Based on the authentication user information and the logout information input from the operation user detection part 55, the transfer data determination part 91 specifies the user logged in to each of the other MFPs 100A to 100C. Hereinafter, a user who is logged in to any of the other MFPs 100A to 100C is referred to as an other-apparatus user, and a device logged in by the other-apparatus user among the other MFPs 100A to 100C is referred to as an operating apparatus. The transfer data determination part 91 determines data to be stored into the RAM 114 for the other-apparatus user.

The transfer data determination part 91 determines data associated with the other-apparatus user as transfer data, among the data stored in the HDD 115. Specifically, the transfer data determination part 91 determines, as the transfer data, the data stored in the individual area associated with the other-apparatus user among the individual area of the HDD 115, the data stored in the shared area of the HDD 115, and a print job including the user identification information of the other-apparatus user. When the HDD 115 stores a plurality of pieces of data associated with the user identification information of the other-apparatus user, the transfer data determination part 91 determines all of the plurality of pieces of data as the transfer data.

A storage capacity of the RAM 114 is smaller than a storage capacity of the HDD 115. Therefore, in a case where not all of the transfer data can be stored in the RAM 114, when there are a plurality of pieces of data associated with the user identification information of the other-apparatus user among the data stored in the HDD 115, the transfer data determination part 91 determines one or more pieces of data as the transfer data among the plurality of pieces of data. For example, the transfer data determination part 91 determines data stored last as the transfer data, among the plurality of pieces of data associated with the other-apparatus user.

The transfer data determination part 91 may specify a plurality of other-apparatus users. When determining the plurality of other-apparatus users, the transfer part 65 determines transfer data to be stored into the RAM 114 for each of the plurality of other-apparatus users. When there are a plurality of other-apparatus users, there is a case where not all of the plurality of pieces of data respectively related to the plurality of other-apparatus users stored in the HDD 115 can be stored in the RAM 114. The transfer data determination part 91 determines data stored first in the HDD 115 as the transfer data, among the plurality of pieces of data respectively related to the plurality of other-apparatus users stored in the HDD 115.

Further, when a size of the data determined as the transfer data is larger than a free capacity capable of storing in the RAM 114, the transfer data determination part 91 divides the data in a page unit, and determines the data including a first page as the transfer data among the plurality of pieces of divided data.

Figure 5:
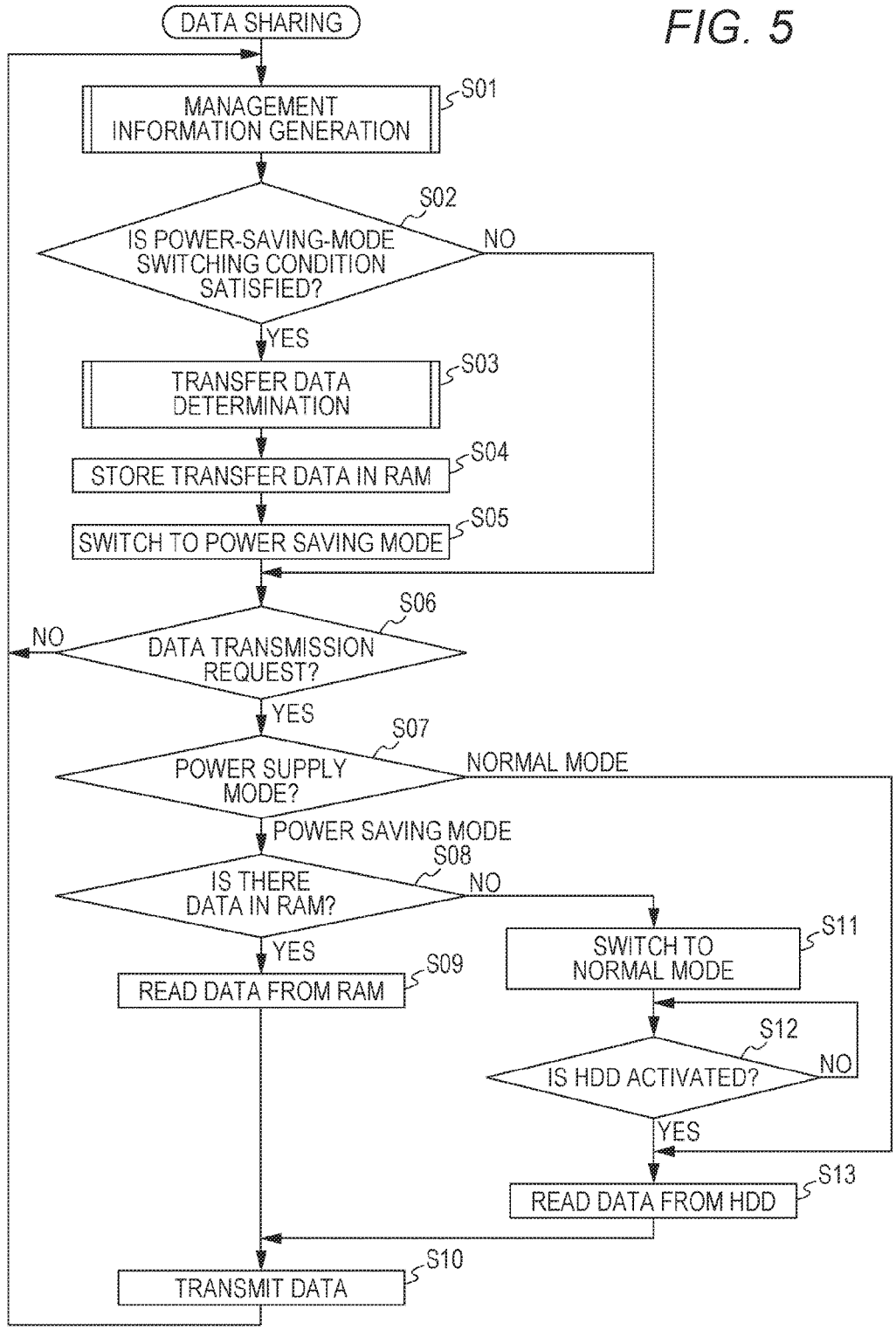
FIG. 5 is a flowchart showing an example of a flow of a data sharing process.

FIG. 5 is a flowchart showing an example of a flow of a data sharing process. The data sharing process is a process that is executed by the CPU 111, by the CPU 111 provided to the MFP 100 executing the data-sharing program stored in the ROM 113, the HDD 115, and the CD-ROM 118. Referring to FIG. 5, the CPU 111 executes a management information generation process (step S01). While details of the management information generation process will be described later, it is a process of generating management information for data stored in any of the MFPs 100 and 100A to 100D. The management information includes data identification information for identifying the data, the sharing identification information or the user identification information for identifying the user associated with the data, and the apparatus identification information for identifying the apparatus stored with the data.

In the next step S02, it is determined whether a condition for switching the power supply mode to the power saving mode is satisfied. When the predetermined time has elapsed without the operation part 163 accepting an operation in the normal mode state, it is determined that the power-saving-mode switching condition is satisfied. Further, in a case where the user remotely operates the MFP 100 with any of the PCs 200 and 200A to 200C, for example, with the PC 200, when the user operating the PC 200 logs out, it is determined that the power-saving-mode switching condition is satisfied. When the power-saving-mode switching condition is satisfied, the process proceeds to step S03, otherwise the process proceeds to step S06.

In step S03, the transfer data determination process is executed, and the process proceeds to step S04. While details of the transfer data determination process will be described later, it is a process to determine the transfer data to be stored into the RAM 114. In the next step S04, the transfer data is stored in the RAM 114, and the process proceeds to step S05. In step S05, the power supply mode is switched to the power saving mode, and the process proceeds to step S06.

In step S06, it is determined whether a data transmission request has been received. When the communication I/F part 112 has received a data transmission request from any of the other MFPs 100A to 100D, the process proceeds to step S07, otherwise the process returns to step S01.

In step S07, the process branches according to the power supply mode. When it is in the power saving mode, the process proceeds to step S08, and when it is the normal mode, the process proceeds to step S13. In step S08, it is determined whether the data specified by the data transmission request is stored in the RAM 114. When the data is stored in the RAM 114, the process proceeds to step S09, otherwise the process proceeds to step S11. In step S09, the data specified by the data transmission request is read out from the RAM 114, and the process proceeds to step S10. In step S10, when the process proceeds from step S09, the data is transmitted and the process returns to step S01. Further, the communication I/F part 112 is controlled to transmit the data read out from the RAM 114 in step S09, to the apparatus that has transmitted the data transmission request.

In step S11, the power supply mode is switched to the normal mode, and the process proceeds to step S12. In step S12, a standby state continues until the HDD 115 is activated (NO in step S12). When the HDD 115 is activated (YES in step S12), the process proceeds to step S13. In step S13, the data specified by the data transmission request is read out from the HDD 115, and the process proceeds to step S10. In step S10, when the process proceeds from step S12, the communication I/F part 112 is controlled to transmit the data read out from the RAM 114 in step S13 to the apparatus that has transmitted the data transmission request, and the process returns to step S01.

Figure 6:
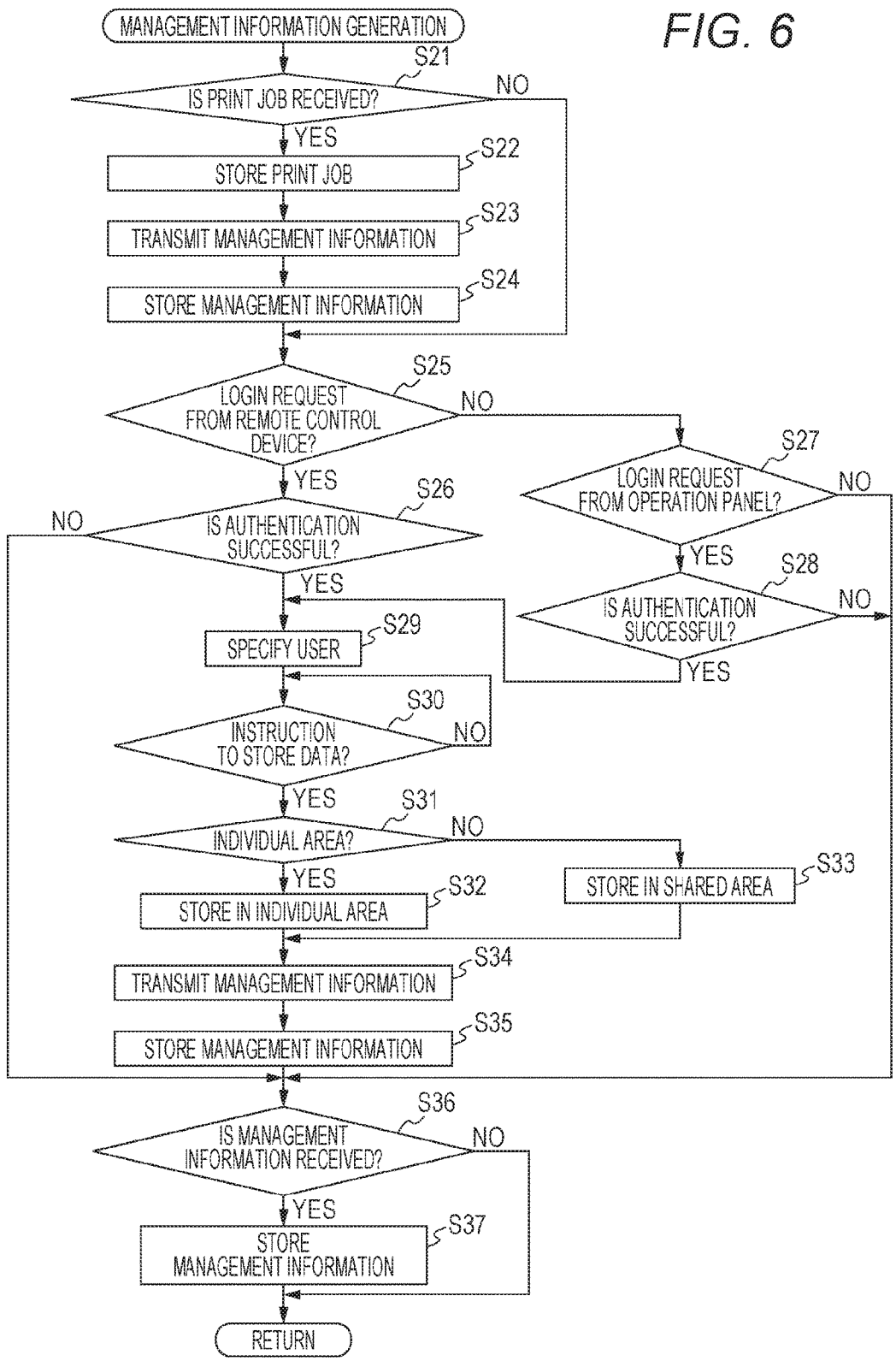
FIG. 6 is a flowchart showing an example of a flow of a management information generation process.

FIG. 6 is a flowchart showing an example of a flow of the management information generation process. The management information generation process is a process executed in step S01 of FIG. 5. Referring to FIG. 6, the CPU 111 determines whether a print job has been received (step S21). When the communication I/F part 112 receives a print job from any of the PCs 200 and 200A to 200C, the process proceeds to step S22, otherwise the process proceeds to step S25. In step S22, the received print job is stored in the HDD 115, and the process proceeds to step S23. In step S23, management information is transmitted, and the process proceeds to step S24. The management information includes job identification information for identifying the print job, the user identification information included in the print job, and the apparatus identification information for identifying the apparatus. The communication I/F part 112 is controlled to transmit management information to each of the other MFPs 100A to 100D registered in advance in order to realize the ubiquitous printing function. In step S24, the management information is stored in the processing area of the HDD 115, and the process proceeds to step S25.

In step S25, it is determined whether there is a login request from a remote operating device. The remote operating devices are, for example, the PCs 200 and 200A to 200C. When the login request is received from any of the PCs 200 and 200A to 200C by controlling the communication I/F part 112, the process proceeds to step S26. Otherwise, the process proceeds to step S27. In step S26, it is determined whether the authentication of the user is successful. When the authentication is successful, the process proceeds to step S29, otherwise the process proceeds to step S36.

In step S27, it is determined whether the login request has been issued from the operation panel 160. When authentication information is entered by the user operating the operation part 163, it is determined that there is the login request. In step S28, it is determined whether authentication of the user operating the operation part 163 is successful. When the authentication is successful, the process proceeds to step S29, otherwise the process proceeds to step S36.

In step S29, the authenticated user is specified, and the process proceeds to step S30. When the process proceeds from step S26, the user operating any of the PCs 200 and 200A to 200C is specified. When the process proceeds from step S28, the user operating the operation part 163 is specified. In step S30, it is determined whether an instruction to store data has been accepted. When the user specified in step S29 operates any of the PCs 200 and 200A to 200C, for example, the PC 200, it is determined whether the communication I/F part 112 has received the instruction to store data, from the PC 200. The instruction to store data includes data, and information indicating a storage destination of the data. The storage destination of the data indicates distinction between the individual area and the shared area. When the user specified in step S29 operates the operation part 163, the instruction to store data indicates an instruction to read a document by the document reading part 130, and a storage destination of the data output by the document reading part 130. A standby state continues until accepting the instruction to store data (NO in step S30). Upon accepting the instruction to store data (YES in step S30), the process proceeds to step S31. In addition to the instruction to store data, an instructed process is executed when accepting the instruction to execute another process.

In step S31, it is determined whether the storage destination specified by the data storage instruction is the individual area. When the storage destination is the individual area of the HDD 115, the process proceeds to step S32, when the storage destination is a shared area of the HDD 115, the process proceeds to step S33. In step S32, data is stored in the individual area allocated in the HDD 115 to the user specified in step S29, and the process proceeds to step S34. In step S33, data is stored in the shared area of the HDD 115, and the process proceeds to step S34.

In step S34, the management information is transmitted, and the process proceeds to step S35. The communication I/F part 112 is controlled to transmit management information to each of the other MFPs 100A to 100C registered in order to realize the ubiquitous printing function. For the data stored in the HDD 115 in step S32, the management information includes data identification information for identifying the data, the user identification information for identifying the user specified in step S29, and the apparatus identification information for identifying the MFP 100. For the data stored in the HDD 115 in step S33, the management information includes data identification information for identifying the data, the sharing identification information, and the apparatus identification information for identifying the MFP 100. In step S35, the management information is stored in the HDD 115, and the process proceeds to step S36.

In step S36, it is determined whether management information has been received. When the management information is received from any of the other MFPs 100A to 100C by controlling the communication I/F part 112, the process proceeds to step S37. Otherwise, the process returns to the data sharing process. In step S37, the received management information is stored in the HDD 115, and the process returns to the data sharing process.

Figure 7:
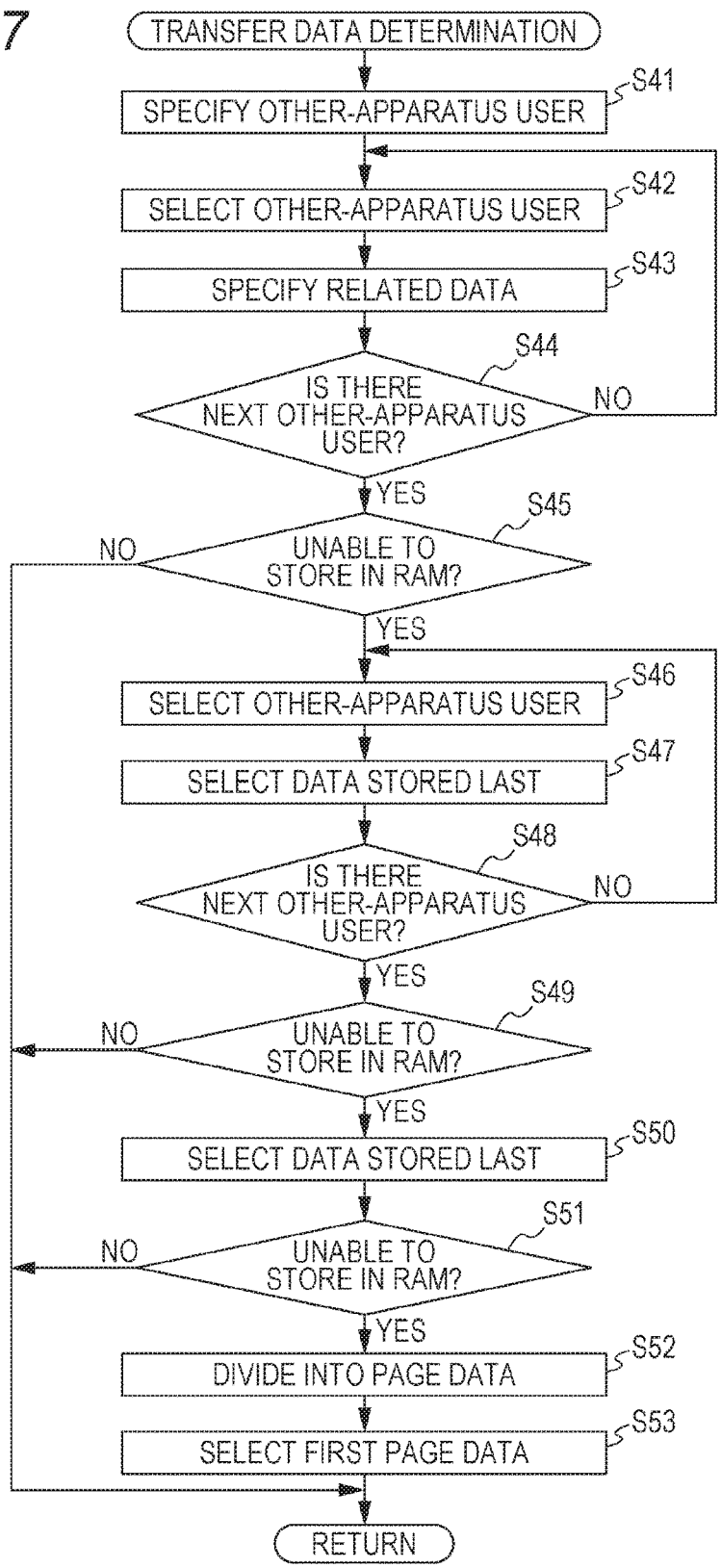
FIG. 7 is a flowchart showing an example of a flow of a transfer data determination process.

FIG. 7 is a flowchart showing an example of a flow of the transfer data determination process. The transfer data determination process is a process executed in step S03 of FIG. 5. Referring to FIG. 7, an other-apparatus user is specified (step S41). The communication I/F part 112 is controlled to query for the user logged in to the other MFPs 100A to 100C, and specifies the user who receives responses from each of the other MFPs 100A to 100C as the other-apparatus user. In the next step S42, one of the other-apparatus users is selected as a processing target. Then, the related data is specified (step S43). The data related to the other-apparatus user selected as the processing target is specified as the related data, among the data stored in the HDD 115. The related data includes all the data stored in the individual area allocated to the other apparatus user among the areas of the HDD 115, all the data stored in the shared area of the HDD 115, and a print job with the user identification information of the other-apparatus user among the print jobs stored in the HDD 115. In the next step S44, it is determined whether there is an other-apparatus user that is not selected as the processing target in step S42. When there is an other-apparatus user unselected, the process returns to step S42, otherwise the process proceeds to step S45.

In step S45, it is determined whether the related data specified in step S43 can be stored in the RAM 114. When the free capacity of the RAM 114 is larger than the sum of a data amount of the related data, it is determined that the related data can be stored in the RAM 114. If it is not possible to store the related data in the RAM 114, the process proceeds to step S46, but if the related data can be stored in the RAM 114, the process returns to the data sharing process.

In step S46, similarly to step S42, the other-apparatus user is selected. Then, the related data stored last in the HDD 115 is selected among one or more pieces of related data related to the other-apparatus user selected as the processing target, and the process proceeds to step S48. Data that is related to one or more pieces of the related data related to the other-apparatus user selected as the processing target and other than the related data stored last in the HDD 115 is excluded from the related data. This is because the related data stored last in the HDD 115 is likely to be image-formed by the other-apparatus user. In step S48, similarly to step S44, if there is an other-apparatus user unselected, the process returns to step S46. If there is no other-apparatus user unselected, the process proceeds to step S49.

When the process proceeds to step S49, one piece of related data is selected for each of one or more other-apparatus users. In step S49, similarly to step S45, it is determined whether the related data selected in step S47 can be stored in the RAM 114. When the free capacity of the RAM 114 is larger than the sum of a data amount of one or more pieces of related data respectively corresponding to the one or more other-apparatus users, it is determined that the related data can be stored in the RAM 114. If it is not possible to store the related data in the RAM 114, the process proceeds to step S50, but if the related data can be stored in the RAM 114, the process returns to the data sharing process.

In step S50, among the related data selected in step S47, the data stored last in the HDD 115 is selected as the related data, and the process proceeds to step S51. The related data that has been selected in step S47 and is other than the related data stored last in the HDD 115 is excluded from the related data. This is because the related data stored last in the HDD 115 is most likely to be image-formed by the other-apparatus user.

In step S51, it is determined whether the related data selected in step S50 can be stored in the RAM 114. If it is not possible to store the related data in the RAM 114, the process proceeds to step S52, but if the related data can be stored in the RAM 114, the process returns to the data sharing process.

In step S52, the related data selected in step S50 is divided into page data. The related data is divided into data of a plurality of pages included in the related data, and a plurality of pieces of page data in a page unit. Then, the page data of the first page is selected as the related data (step S53), and the process returns to the data sharing process.

FIG. 8 is a flowchart showing an example of the flow of an image formation process. The data sharing process is a process that is executed by the CPU 111, by the CPU 111 provided to the MFP 100 executing an image-forming program stored in the ROM 113, the HDD 115, and the CD-ROM 118. The image-forming program is a part of the data-sharing program. Referring to FIG. 8, the CPU 111 determines whether the operation part 163 has accepted the login request (step S61). It is determined whether the operation part 163 has accepted the login request entered by the user. When the login request has been accepted, the process proceeds to step S62, otherwise the process proceeds to step S63. In step S62, it is determined whether the authentication is successful. When the authentication information accepted by the operation part 163 is previously stored in the HDD 115, the user is authenticated. When the authentication is successful, the process proceeds to step S65, otherwise the process returns to step S61. In step S65, the authenticated user is specified, and the process proceeds to step S66.

In step S63, it is determined whether the login request has been received from the remote operating device. In one or more embodiments of the present invention, the remote operating device is the PCs 200 and 200A to 200C. When the login request is received from any of the PCs 200 and 200A to 200C by controlling the communication I/F part 112, the process proceeds to step S64. Otherwise, the process returns to step S61. In step S64, it is determined whether the authentication is successful. When the authentication information received from any of the PCs 200 and 200A to 200C is previously stored in the HDD 115, the user is authenticated. When the authentication is successful, the process proceeds to step S65, otherwise the process returns to step S61. In step S65, the authenticated user is specified, and the process proceeds to step S66.

In step S66, the data selection screen is generated based on the management information stored in the HDD 115. Among the management information stored in the HDD 115, the CPU 111 determines the data identification information included in the management information including the user identification information of the user specified in step S65, and data identification information included in the management information including the sharing identification information, and generates the data selection screen to selectably display the determined data identification information. The management information including the sharing identification information includes data identification information of data stored in the shared area of the HDD 115 provided in each of the MFPs 100 and 100A to 100D.

In step 567, the data selection screen is displayed, and the process proceeds to step 568. When the authenticated user operates the operation part 163, the data selection screen is displayed on the display part 161, and when the authenticated user operates any of the PCs 200 and 200A to 200C, for example, the PC 200, the communication I/F part 112 is controlled to transmit the data selection screen to the PC 200. When the user operates the PC 200, the data selection screen transmitted by the communication I/F part 112 is displayed on the PC 200, and the communication I/F part 112 receives an input operation to the PC 200 by the user according to the data selection screen.

In the next step S68, a standby state continues until data is selected (NO in step S68). When the data is selected (YES in step S68), the process proceeds to step S69. In a case where the user operates the operation part 163, when the data identification information selected by the user is selected through the operation accepted by the operation part 163, it is determined that the data is selected. When the user operates the PC 200, the PC 200 returns the data identification information selected by the user according to an operation input to the PC 200 by the user. Therefore, when the communication I/F part 112 receives the data identification information from the PC 200, it is determined that data has been selected. In the next step S69, it is determined whether the apparatus stored with the data selected in step S68 is the own apparatus. When the data is stored in the HDD 115 of the own apparatus, the process proceeds to step S70. Otherwise, the process proceeds to step S71. It is determined whether the apparatus identification information included in the management information including the data identification information of the selected data is the apparatus identification information of the own apparatus.

In step S70, the data selected in step S68 is read out from the HDD 115, and the process proceeds to step S73. In step S71, a data transmission request is transmitted, and the process proceeds to step S72. The management information including the data identification information of the data selected in step S68 is extracted among the management information stored in the HDD 115, and the apparatus of the apparatus identification information included in the extracted management information is specified among the MFPs 100A to 100C. Here, a case of specifying the MFP 100A will be described. The CPU 111 controls the communication I/F part 112 to transmit, to the MFP 100A, a data transmission request including the data identification information of the data selected in step S68.

The MFP 100A that receives the data transmission request returns the data specified by the data identification information included in the data transmission request. In step S72, the communication I/F part 112 is controlled to cause a standby state until data is received from the MFP 100A (NO in step S72). When the communication I/F part 112 receives the data from the MFP 100A (YES in step S72), the process proceeds to step S73.

In step S73, an image of data is formed, and the process proceeds to step S74. When the process proceeds from step S70, an image of the data read out from the HDD 115 is formed. When the process proceeds from step S72, the communication I/F part 112 forms an image of data received from the MFP 100A.

In step S74, it is determined whether the user authenticated in step S62 or step S64 has logged out. When the user has logged out, the process is terminated, otherwise the process returns to step S67.

<First Modification>

The transfer data determination part 91 determines the data stored last as the transfer data, among the plurality of pieces of data associated with the user identification information of the other-apparatus user. However, the transfer data determination part 91 may determine the transfer data by the following method. Further, two or more pieces of data determined by the following method may be determined as the transfer data.

(1) Data stored last in the HDD 115.

(2) Data with a newer date and time stored in the HDD 115 than the data selected last by the other-apparatus user. By communicating with the operating apparatus operated by the other-apparatus user among the MFPs 100A to 100C, the date and time when the data selected last by the other-apparatus user is stored are obtained from the operating apparatus and determined.

(3) Data with the latest date and time stored in an individual area of the HDD 115 when there are a plurality of pieces of data stored in the individual area associated with the other-apparatus user.

(4) Data stored in the HDD 115 on the same day as the data selected last by the other-apparatus user. By communicating with the operating apparatus operated by the other-apparatus user among the MFPs 100A to 100C, the date and time when the data selected last by the other-apparatus user is stored are obtained from the operating apparatus and determined.

(5) A print job including the user identification information of the other-apparatus user and specifying a predetermined post-processing in a printing condition. The predetermined post-processing is the post-processing having a largest number of times that the other-apparatus user has executed with the operating apparatus in the past. By communicating with the operating apparatus operated by the other-apparatus user among the MFPs 100A to 100C, information on the post-processing having the largest number of times the other-apparatus user has executed in the past is obtained from the operating apparatus.

(6) A print job including the user identification information of the other-apparatus user and having the largest number of papers to be formed with an image, when the other MFPs 100A to 100D have different speeds of forming an image on a paper, and the operating apparatus is of a type capable of forming an image at a predetermined speed or higher.

(7) A print job including the user identification information of the other-apparatus user, and specified to use a same type of paper as a type of paper accumulated by the operating apparatus. By communicating with the operating apparatus operated by the other-apparatus user among the MFPs 100A to 100C, the type of paper accumulated by the operating apparatus is obtained.

(8) A print job including the user identification information of the other-apparatus user, and one or more print jobs classified into groups with a largest total number of prints in each group, when a plurality of print jobs are classified into a same group of print jobs having a same date on which they are stored.

(9) Rules established by the user.

<Second Modification>

Data stored in the shared area of the HDD 115 may include data associated with the other-apparatus user, and may include data not associated with the other-apparatus user. Data that is stored in the shared area and is not associated with the other-apparatus user can be accessed by the other-apparatus user. Therefore, when the data associated with the other-apparatus user is stored in the shared area, among the data stored in the HDD 115, the transfer data determination part 91 may determine all of the data stored in the shared area as the transfer data.

As described above, in the MFP 100 according to one or more embodiments of the present invention, before switching the power supply mode from the normal mode to the power saving mode, when there is an operation user operating any of the other MFPs 100A to 100C, for example, the MFP 100A, the data stored in the HDD 115 among the data related to the operation user is stored into the RAM 114 before switching to the power saving mode, and in response to a request from the MFP 100A operated by the operation user, the data specified by the request among the data stored in the RAM 114 is returned without switching to the normal mode. Therefore, it is possible to transmit data related to the operation user operating the MFP 100A, to the MFP 100A, without switching to the normal mode to supply electric power to the HDD 115. Therefore, in an environment where data is shared between the MFP 100 and the MFPs 100A to 100C registered for realizing the ubiquitous printing function, it is possible for the MFP 100 to share data with other MFPs 100A to 100C while keeping the power supply mode in the power saving mode. In addition, in using the MFP 100A operated by an operation user, the MFP 100 can transmit data to the MFP 100A, while keeping the power supply mode in the power saving mode. This eliminates necessity of switching the power supply mode to the normal mode just for transmitting data, enabling reduction of power consumption as much as possible.

Since the data to be shared includes a print job, the user can cause any apparatus among the MFPs 100 and 100A to 100C to execute the print job.

In addition, the data stored in the RAM 114 in the power saving mode is data that satisfies the condition defined by the user among the data stored in the HDD 115, enabling application to the usage environment of the user.

Further, since the data stored in the RAM 114 in the power saving mode is the data stored last among the data stored in the HDD 115, data with a high probability of being printed by the user can be stored into the RAM 114.

When there are a plurality of operation users, for example, when there are an operation user A operating the MFP 100A and an operation user B operating the MFP 100B, the MFP 100 stores, into the RAM 114, the data stored first in the HDD 115 among the related data related to the operation user A and the related data B related to the operation user B that are stored in the HDD 115. Therefore, since the data stored first has high probability to be printed first, data with high probability of being printed can be stored into the RAM 114.

The MFP 100 according to a first modification stores the data having a high probability of being selected as a print target by the operation user in the RAM 114 among the data stored in the HDD 115, as the data to be stored into the RAM 114 in the power saving mode. Therefore, it is possible to reduce the number of times the MFP 100 switches from the power saving mode to the normal mode.

In addition, since the MFP 100 according to the second embodiment stores the data stored in the shared area of the HDD 115 in the RAM 114, for example, even when an operation user operating the MFP 100A selects data stored in the shared area of the HDD 115 provided to the MFP 100 as a print target, it is possible to transmit the data to the MFP 100A without switching from the power saving mode to the normal mode.

In the above-described embodiments, the MFPs 100 and 100A to 100C have been described as examples of information processing apparatuses, but any of PCs 200 and 200A to 200C may be set as an apparatus for realizing the ubiquitous printing function. Needless to say, the embodiments of the present invention may be understood as a data sharing method that causes the MFPs 100, 100A to 100C, and PCs 200 and 200A to 200C, to execute the data sharing process shown in FIG. 5, and as a data-sharing program that causes the CPU 111 provided to each of the MFPs 100 and 100A to 100C, or a CPU provided to the PCs 200 and 200A to 200C, to execute the data sharing method.

<Appendix>

(1) The information processing apparatus according to any one of claims 10 to 14, further comprising a job executor, wherein, in a case where the operation user operates the own apparatus in a state where the operation state is switched to the first operation state, when the print job specified by a data specifier is stored in a second storage, the image former is caused to form an image based on the print job, and when the print job specified by the data specifier is not stored in the second storage, the image former is caused to form an image based on the print job obtained by the data obtainer.

Although the embodiments of the present invention have been described and illustrated in detail, the disclosed embodiments are made for purposes of illustration and example only and not limitation. The scope of the present invention should be interpreted by terms of the appended claims, and it is intended to include all modifications within the meaning and scope equivalent to the claims.

What is claimed is:

1. An information processing apparatus capable of communicating with one or more other information processing apparatuses, the information processing apparatus comprising:
   a volatile storage;
   a nonvolatile storage;
   a storage controller that associates data related to each of a plurality of users with a user associated with the data, and stores the data into the nonvolatile storage;
   a central processing unit (CPU) that:
     shares, with the one or more other information processing apparatuses, management information that associates the data stored in the nonvolatile storage, a user associated with the data, and an own apparatus, and management information that associates data stored in each of the one or more other information processing apparatuses, a user associated with the data, and an apparatus stored with the data;
     detects, as an operation user, a user operating any of the own apparatus and the one or more other information processing apparatuses;
     switches between a first operation state in which electric power is supplied to the nonvolatile storage, and a second operation state in which electric power is not supplied to the nonvolatile storage;
     refers to the management information to specify data related to the operation user and an apparatus stored with the data when the operation user is detected;
     obtains data from a storage device by requesting transmission to the storage device, when the data designated by the operation user among the specified data is stored in any of the one or more other information processing apparatuses in a case where the operation user operates the own apparatus;
     stores data in the volatile storage, the data being stored in the nonvolatile storage among the specified data, before the operation state is switched to the second operation state, when the operation user operates any of the one or more other information processing apparatuses; and
     returns, in response to a request from any of the one or more other information processing apparatuses, data specified by the request among the data stored in the nonvolatile storage in the first operation state, and data specified by the request among data stored in the volatile storage in the second operation state.

2. The information processing apparatus according to claim 1, wherein
   the storage controller stores a print job into the nonvolatile storage in response to receiving the print job, from outside, including user identification information for identifying a user who has instructed printing.

3. The information processing apparatus according to claim 2, wherein
the one or more other information processing apparatuses are any of a plurality of types in which speeds of forming an image on paper are different, and
when the nonvolatile storage stores a plurality of print jobs related to the operation user, and the operating apparatus operated by the operation user is of a type capable of forming an image at a predetermined speed or higher, the CPU determines a print job having a largest number of papers to be formed with an image among the plurality of print jobs.

4. The information processing apparatus according to claim 2, wherein, when the nonvolatile storage stores a plurality of print jobs related to the operation user, the CPU determines a print job specified to use a type of paper that is different from a type of paper accumulated in an own apparatus, and same as a type of paper accumulated by the operating apparatus operated by the operation user, among the plurality of print jobs.

5. The information processing apparatus according to claim 2, wherein, when a plurality of print jobs related to the operation user are stored in the nonvolatile storage, the transferer classifies the plurality of print jobs into a same group of print jobs having a same date on which the print jobs are stored, and determines one or more print jobs classified into groups having a largest number of prints among a plurality of groups.

6. The information processing apparatus according to claim 1, wherein the CPU determines data to be stored into the volatile storage according to a condition determined by a user.

7. The information processing apparatus according to claim 6, wherein, in a case where a plurality of pieces of data associated with the operation user are stored in the nonvolatile storage, the CPU stores data stored last in the nonvolatile storage among the plurality of pieces of data, into the volatile storage.

8. The information processing apparatus according to claim 6, wherein, in a case where there are a plurality of the operation users, the CPU determines data stored first in the nonvolatile storage among a plurality of pieces of data related to each of the plurality of users stored in the nonvolatile storage.

9. The information processing apparatus according to claim 6, wherein, in a case where a plurality of pieces of data related to the detected user are stored in the nonvolatile storage, the CPU determines data with a newer date and time stored in the nonvolatile storage than the data selected by the operation user.

10. The information processing apparatus according to claim 6, wherein
the nonvolatile storage has a shared area shared by a plurality of users as an area to store data, and
in a case where related data associated with the operation user is stored in the shared area, the CPU stores all data stored in the shared area, into the volatile storage.

11. The information processing apparatus according to claim 6, wherein, in a case where a plurality of pieces of data related to the detected user are stored in the nonvolatile storage, the CPU determines data that has been stored in the nonvolatile storage on a same day as the data selected by the operation user.

12. The information processing apparatus according to claim 1, wherein the CPU divides the data in a page unit when a size of the data is larger than a free capacity capable of storing in the volatile storage, and determines data including a first page among a plurality of pieces of divided data.

13. The information processing apparatus according to claim 2, wherein the print job specifies post-processing having a largest number of times the operation user has executed with an operating apparatus in the past, among post-processing that is a process executable with the operating apparatus operated by the operation user, the post-processing being for processing a paper formed with an image, wherein,
when a plurality of print jobs are stored in the nonvolatile storage in association with the operation user, the CPU determines a print job that defines the specified post-processing among the plurality of print jobs.

14. A data sharing method executed in an information processing apparatus capable of communicating with one or more other information processing apparatuses, the information processing apparatus including
a volatile storage that is volatile and
a nonvolatile storage that is nonvolatile,
the data sharing method comprising:
controlling storage by associating data related to each of a plurality of users with a user associated with the data, and storing the data in the nonvolatile storage;
managing data by sharing, with the one or more other information processing apparatuses, management information that associates data stored in each of the one or more other information processing apparatuses, a user associated with the data, and an apparatus stored with the data, wherein the management information includes management information that associates the data stored in the nonvolatile storage, a user associated with the data, and an own apparatus;
detecting an operation user by detecting, as an operation user, a user operating any of the own apparatus and the one or more other information processing apparatuses;
switching an operation state by switching between a first operation state in which electric power is supplied to the nonvolatile storage, and a second operation state in which electric power is not supplied to the nonvolatile storage;
specifying data by referring to the management information to specify data related to the operation user and an apparatus stored with the data when the operation user is detected;
obtaining data by obtaining the data from a storage device by requesting transmission to the storage device, when the data designated by the operation user among the specified data is stored in any of the one or more other information processing apparatuses in a case where the operation user operates the own apparatus;
transferring by storing data into the volatile storage, the data being stored in the nonvolatile storage among the specified data, before the operation state is switched to the second operation state, when the operation user operates any of the one or more other information processing apparatuses; and
supplying data by returning, in response to a request from any of the one or more other information processing apparatuses, data specified by the request among the data stored in the nonvolatile storage in the first operation state, and data specified by the request among data stored in the volatile storage in the second operation state.

15. A non-transitory recording medium storing a computer readable data-sharing program executed by a computer that controls an information processing apparatus capable of communicating with one or more other information processing apparatuses, the information processing apparatus including
a volatile storage that is volatile and
a nonvolatile storage that is nonvolatile,
the computer readable data-sharing program causing the computer to execute:
controlling storage by associating data related to each of a plurality of users with a user associated with the data, and storing the data in the nonvolatile storage;
managing data by sharing, with the one or more other information processing apparatuses, management information that associates data stored in each of the one or more other information processing apparatuses, a user associated with the data, and an apparatus stored with the data, wherein the management information includes management information that associates the data stored in the nonvolatile storage, a user associated with the data, and an own apparatus;
detecting an operation user by detecting, as an operation user, a user operating any of the own apparatus and the one or more other information processing apparatuses;
switching an operation state by switching between a first operation state in which electric power is supplied to the nonvolatile storage, and a second operation state in which electric power is not supplied to the nonvolatile storage;
specifying data by referring to the management information to specify data related to the operation user and an apparatus stored with the data when the operation user is detected;
obtaining data by obtaining the data from a storage device by requesting transmission to the storage device, when the data designated by the operation user among the specified data is stored in any of the one or more other information processing apparatuses in a case where the operation user operates the own apparatus;
transferring by storing data into the volatile storage, the data being stored in the nonvolatile storage among the specified data, before the operation state is switched to the second operation state, when the operation user operates any of the one or more other information processing apparatuses; and
supplying data by returning, in response to a request from any of the one or more other information processing apparatuses, data specified by the request among the data stored in the nonvolatile storage in the first operation state, and data specified by the request among data stored in the volatile storage in the second operation state.

* * * * *